(12) United States Patent
Johnson

(10) Patent No.: US 8,602,700 B2
(45) Date of Patent: Dec. 10, 2013

(54) SHIPPING FIXTURE AND METHOD FOR TRANSPORTING ROTOR BLADES

(75) Inventor: Stephen Bertram Johnson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 13/397,767

(22) Filed: Feb. 16, 2012

(65) Prior Publication Data
US 2013/0216325 A1    Aug. 22, 2013

(51) Int. Cl.
*B60P 3/40* (2006.01)

(52) U.S. Cl.
USPC .......................................................... 410/44

(58) Field of Classification Search
USPC .......................................................... 410/44
See application file for complete search history.

(56) References Cited

U.S. PATENT DOCUMENTS

| | | | |
|---|---|---|---|
| 5,145,073 A * | 9/1992 | Kitagawa et al. | 211/41.14 |
| 7,364,407 B2 | 4/2008 | Grabau et al. | |
| 7,429,156 B2 | 9/2008 | Jensen | |
| 7,591,621 B1 | 9/2009 | Landrum et al. | |
| 7,670,090 B1 | 3/2010 | Landrum et al. | |
| 7,690,875 B2 | 4/2010 | Grabau | |
| 7,704,024 B2 | 4/2010 | Kootstra et al. | |
| 7,713,007 B2 | 5/2010 | Kootstra | |
| 7,967,536 B2 | 6/2011 | Broderick et al. | |
| 8,177,462 B2 * | 5/2012 | Riddell | 410/44 |
| 8,342,491 B2 * | 1/2013 | Jorgensen et al. | 269/17 |
| 2003/0175089 A1 * | 9/2003 | Almind | 410/2 |
| 2005/0002749 A1 * | 1/2005 | Andersen et al. | 410/82 |
| 2005/0180833 A1 * | 8/2005 | Almind | 410/2 |
| 2006/0251517 A1 * | 11/2006 | Grabau | 416/202 |
| 2007/0189895 A1 * | 8/2007 | Kootstra et al. | 416/9 |
| 2007/0253829 A1 | 11/2007 | Wessel et al. | |
| 2009/0070977 A1 | 3/2009 | Livingston et al. | |
| 2009/0169323 A1 | 7/2009 | Livingston | |
| 2009/0274529 A1 | 11/2009 | Broderick et al. | |
| 2010/0168960 A1 | 7/2010 | Pederson | |
| 2010/0260603 A1 | 10/2010 | Dawson et al. | |
| 2011/0030183 A1 | 2/2011 | Livingston et al. | |
| 2011/0094428 A1 | 4/2011 | Grabau | |

FOREIGN PATENT DOCUMENTS

| | | |
|---|---|---|
| EP | 1561947 | 8/2005 |
| EP | 2075467 | 7/2009 |
| EP | 1644271 | 10/2009 |
| EP | 2065299 | 1/2011 |
| EP | 2035257 | 3/2011 |

* cited by examiner

Primary Examiner — H Gutman
(74) Attorney, Agent, or Firm — Dority & Manning, P.A.

(57) ABSTRACT

A shipping fixture and method for transporting a rotor blade are disclosed. The shipping fixture is configured for stacking thereon of an adjacent shipping fixture. The shipping fixture includes a first frame comprising a first support member and a first nesting feature. The first frame is further configured for stacking thereon of the adjacent shipping fixture. The shipping fixture further includes a second frame comprising a second support member, a second nesting feature, and a mounting feature. The second nesting feature mates with the first nesting feature to removably nest the second frame to the first frame at least partially within the first frame. The mounting feature is configured for mounting of the rotor blade thereon.

18 Claims, 6 Drawing Sheets

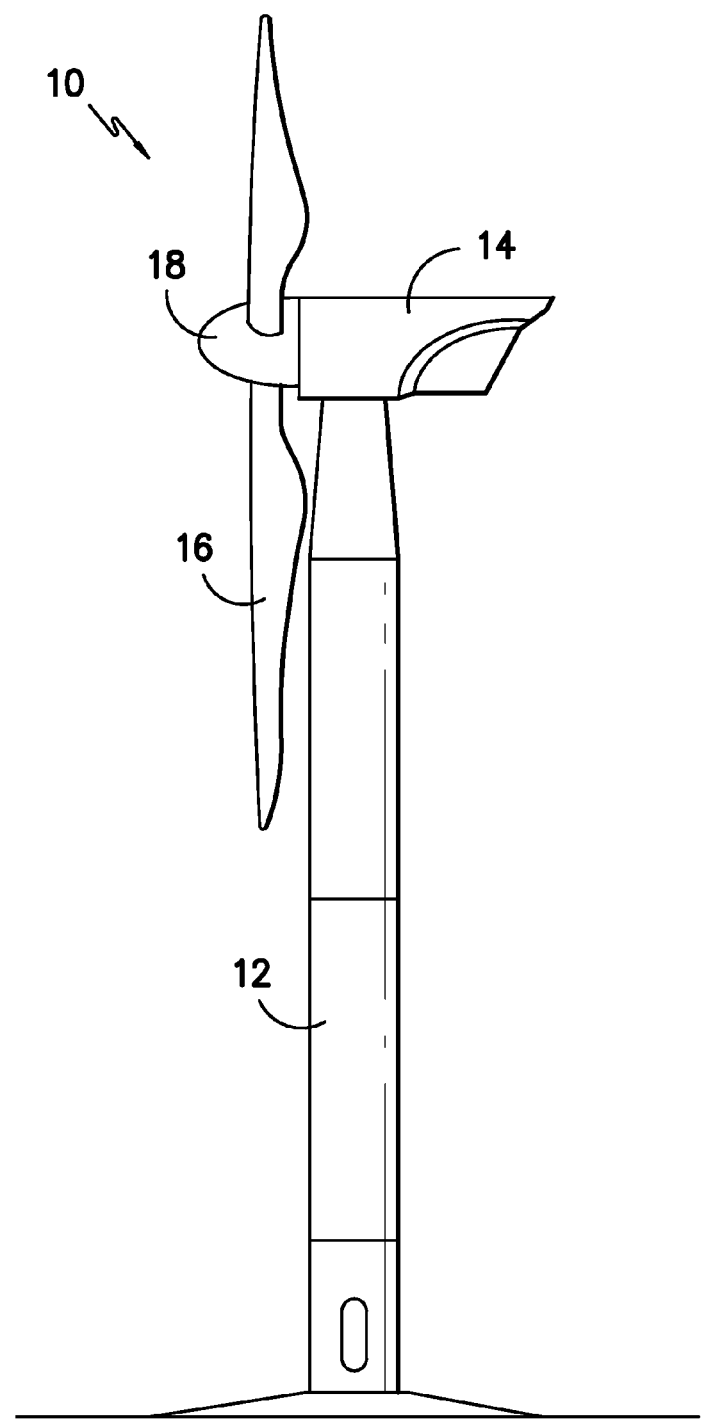
FIG. -1-
PRIOR ART

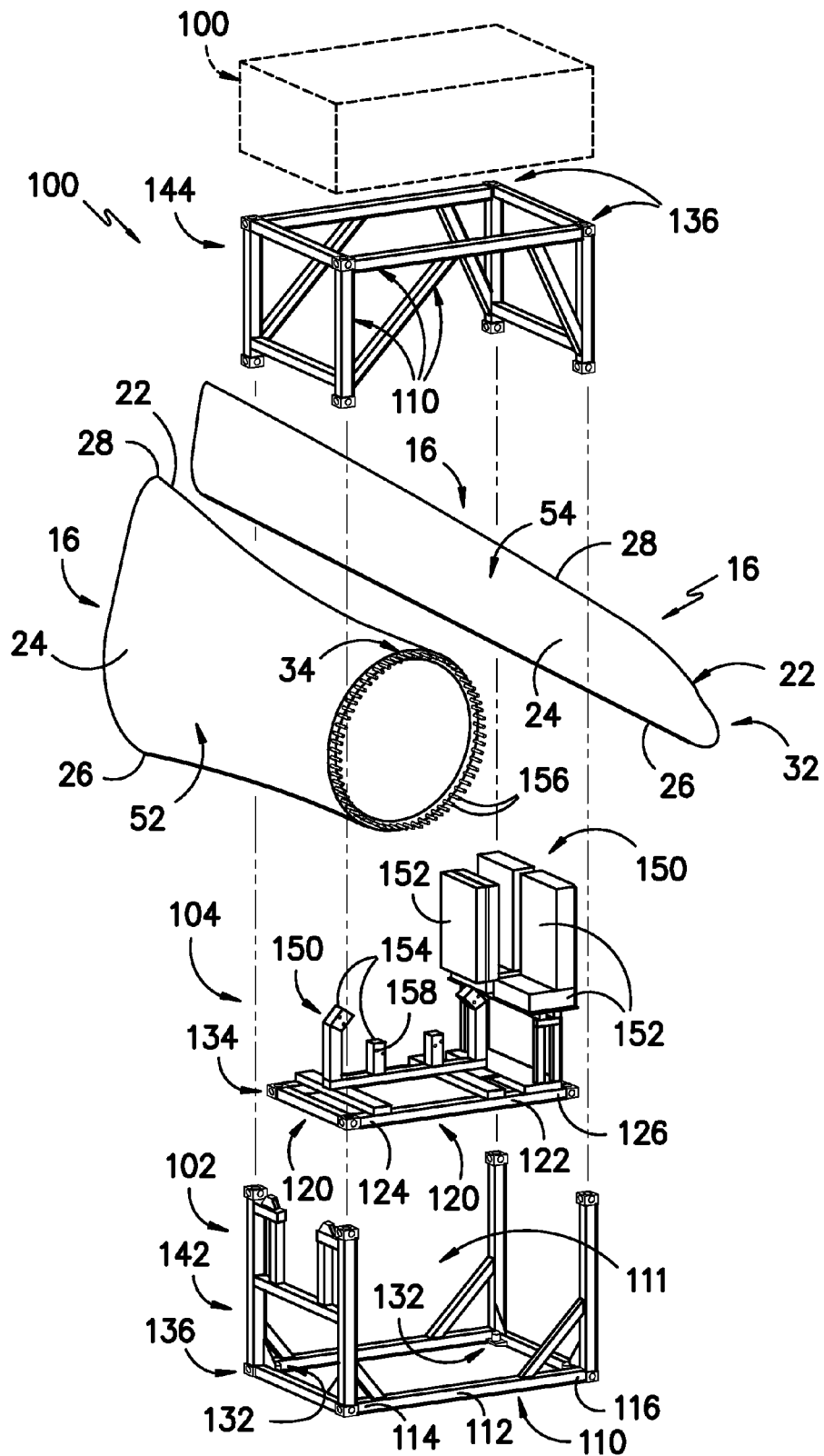
FIG. -2-

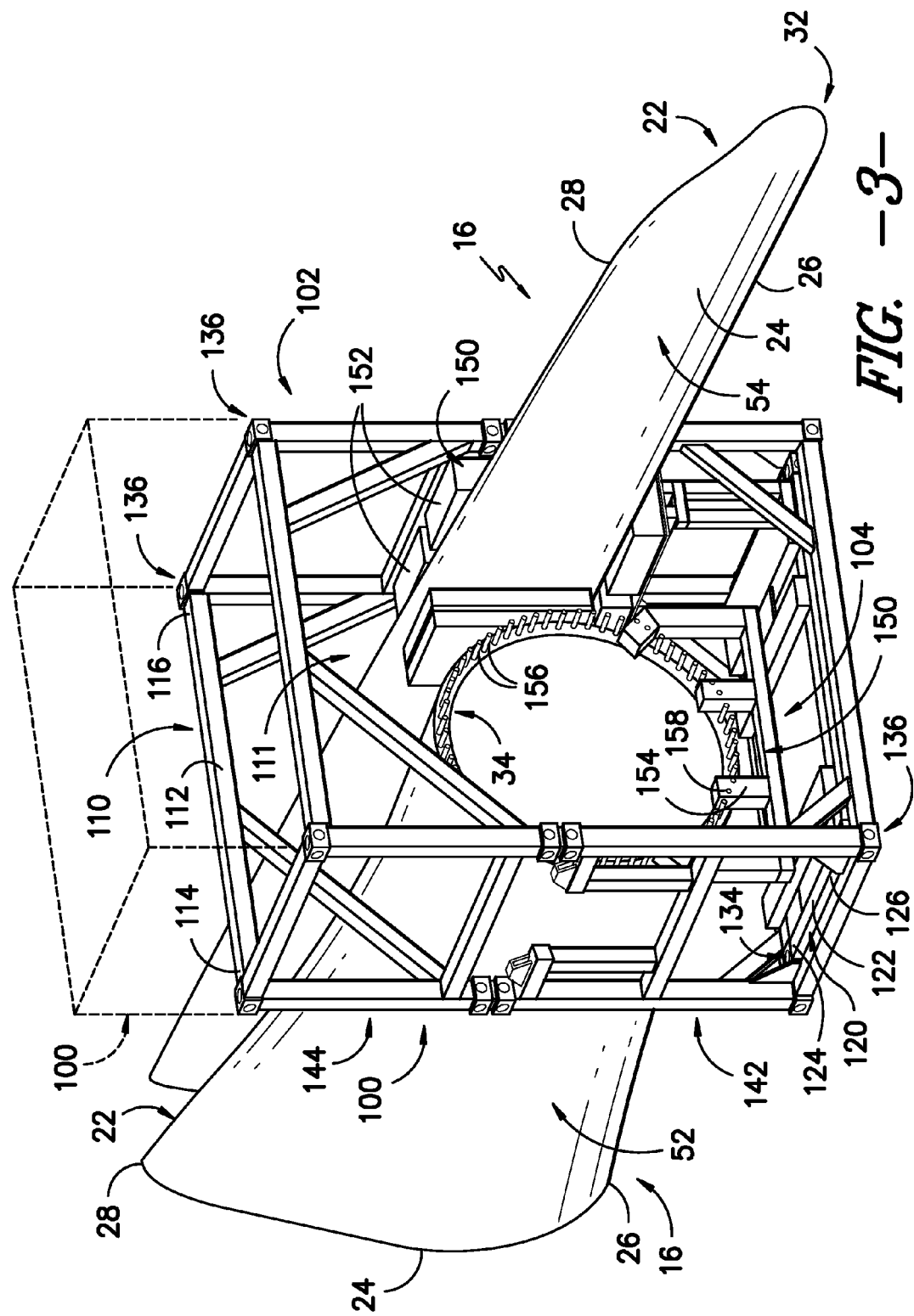
FIG. -3-

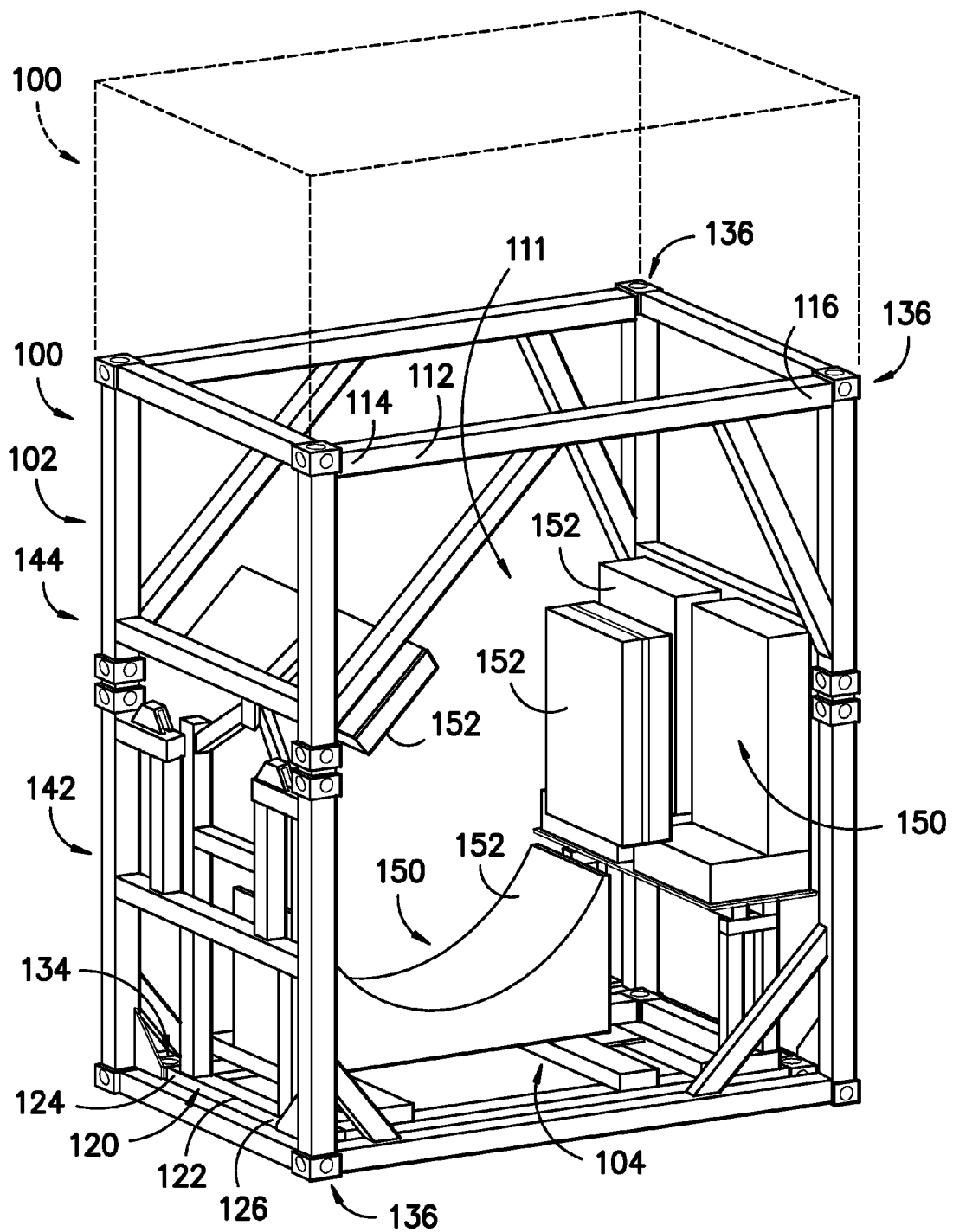
FIG. -4-

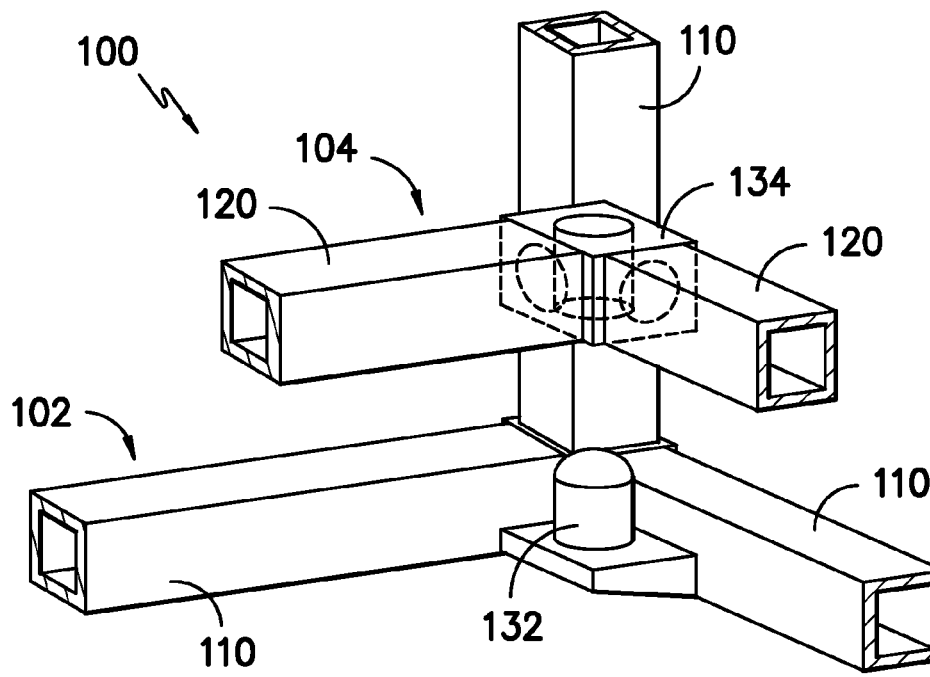
FIG. -5-
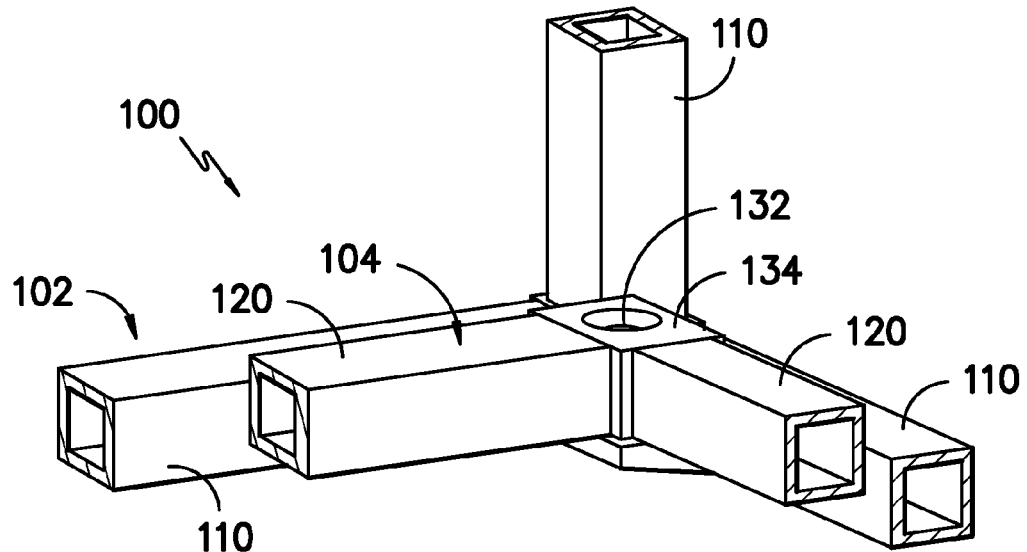
FIG. -6-

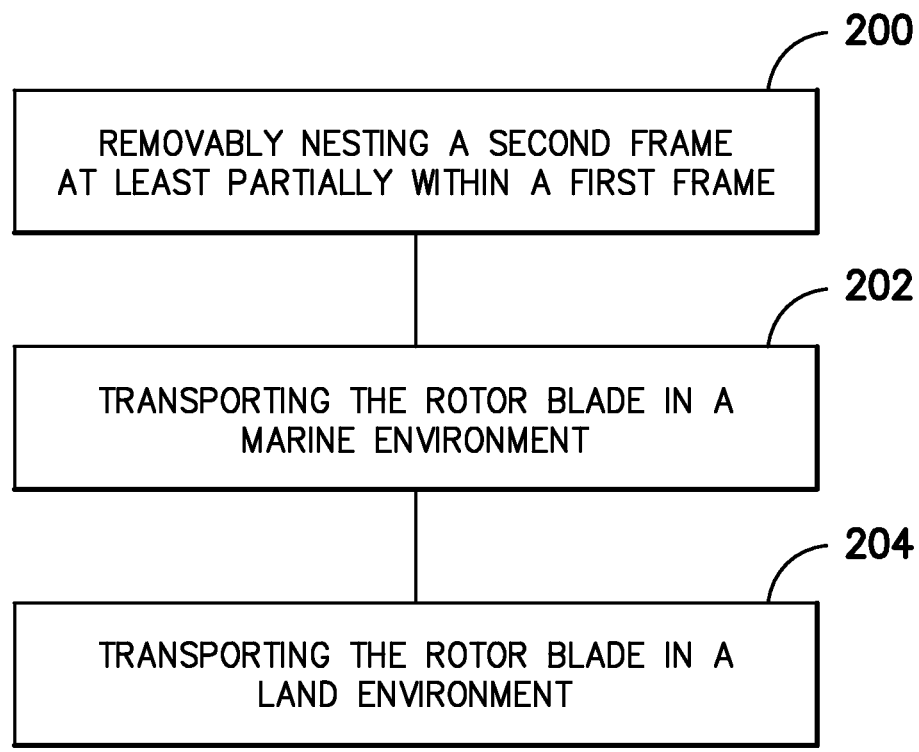
FIG. -7-

SHIPPING FIXTURE AND METHOD FOR TRANSPORTING ROTOR BLADES

FIELD OF THE INVENTION

The present disclosure relates in general to wind turbine rotor blades, and more particularly to shipping fixtures and methods for transporting the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades are typically manufactured at locations that are separate from the locations where the wind turbines will be constructed. Thus, an assembled rotor blade (or portion thereof) may require transporting to the construction location. Further, in many cases, transportation of a rotor blade to a construction site requires both marine transport across a body of water and land transport across land. Marine transport may occur in a suitable transport ship, while land transport may occur in a truck on a road or in a train on a railroad.

Typically, various shipping fixtures are utilized during transportation of a rotor blade to contain, secure and protect the rotor blade. For example, one shipping fixture may contain, secure and protect a tip portion of a rotor blade, while another may contain, secure and protect a root portion of that rotor blade. However, currently known shipping fixtures have a variety of disadvantages. In particular, different shipping fixtures are currently required for marine transport versus land transport. Marine transport shipping fixtures must generally be capable of stacking, to allow for columns of shipping fixtures containing rotor blades to be provided on the ships and transported. Stacking allows for efficient and cost-effective use of space on the ships, but requires that the fixtures have additional reinforcement and larger sizes to handle increased loads due to stacking. Land transport shipping fixtures, on the other hand, do not require stacking capability but must be relatively small and lightweight to provide ease of movement onto and off of trucks and/or trains.

Thus, during transportation of a rotor blade across both marine and land environments, multiple fixture changes must be made. For example, a rotor blade may require a land transport shipping fixture for land transportation to a ship, a separate marine transport shipping fixture for transporting on the ship, and a separate land transport shipping fixture for land transportation from the ship. The use of these multiple separate shipping fixtures increases the time, cost, and amount of equipment required for shipping of rotor blades, and additionally increases the risk of damage to the rotor blades during changing of the rotor blades from land fixtures to marine fixtures, and vice versa.

Accordingly, an improved shipping fixture and method for transporting one or more rotor blades is desired in the art. In particular, a shipping fixture and method that are optimized for use in both land transportation and marine transportation of a rotor blade would be advantageous.

BRIEF DESCRIPTION OF THE INVENTION

Aspects and advantages of the invention will be set forth in part in the following description, or may be obvious from the description, or may be learned through practice of the invention.

In one embodiment, a shipping fixture for transporting a rotor blade is disclosed. The shipping fixture is configured for stacking thereon of an adjacent shipping fixture. The shipping fixture includes a first frame comprising a first support member and a first nesting feature. The first frame is further configured for stacking thereon of the adjacent shipping fixture. The shipping fixture further includes a second frame comprising a second support member, a second nesting feature, and a mounting feature. The second nesting feature mates with the first nesting feature to removably nest the second frame to the first frame at least partially within the first frame. The mounting feature is configured for mounting of the rotor blade thereon.

In another embodiment, a method for transporting a rotor blade is disclosed. The method includes removably nesting a second frame at least partially within a first frame. The first frame is configured for stacking thereon of an adjacent shipping fixture. A rotor blade is mounted on the second frame. The method further includes transporting the rotor blade in a marine environment.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is an exploded perspective view of a shipping fixture according to one embodiment of the present disclosure;

FIG. 3 is an assembled perspective view of the shipping fixture of FIG. 1;

FIG. 4 is an assembled perspective view of a shipping fixture according to another embodiment of the present disclosure;

FIG. 5 is an exploded perspective view of a first nesting feature and a second nesting feature for nesting a second frame of a shipping fixture at least partially within a first frame of the shipping fixture according to one embodiment of the present disclosure;

FIG. 6 is an assembled perspective view of the first nesting feature and a second nesting feature of FIG. 5; and, FIG. 7 is a flow chart illustrating a method for transporting a rotor blade according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A rotor is further mounted on the tower 12. The rotor includes a plurality of rotor blades 16 connected to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 through 3, a rotor blade 16 according to the present disclosure may include exterior surfaces defining a pressure side 22, a suction side 24, a leading edge 26, and a trailing edge 28. The pressure side 22 and suction side 24 may each extend between the leading edge 26 and the trailing edge 28. The exterior surfaces may extend between a blade tip 32 and a blade root 34 in a generally span-wise direction, as discussed below.

The pressure side 22, suction side 24, leading edge 26 and trailing edge 28 may be generally aerodynamic surfaces having generally aerodynamic contours, as is generally known in the art. Thus, the exterior surfaces of the rotor blade 16 may define an aerodynamic profile, such as an airfoil-like cross-sectional profile, for the rotor blade 16. The aerodynamic profile includes the pressure side 22, suction side 24, leading edge 26 and trailing edge 28.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord and a span extending in chord-wise and span-wise directions, respectively. The chord may vary throughout the span of the rotor blade 16. Thus, as discussed below, a local chord may be defined for the rotor blade 16 at any point on the rotor blade 16 along the span.

Additionally, as shown in FIGS. 2 through 3, the rotor blade 16 may define an inboard portion 52 and an outboard portion 54. The inboard portion 52 may be a span-wise portion of the rotor blade 16 extending from the root 34. For example, the inboard portion 52 may, in some embodiments, include approximately 33%, 40%, 50%, 60%, 67%, or any percentage or range of percentages therebetween, or any other suitable percentage or range of percentages, of the span from the root 34. The outboard portion 54 may be a span-wise portion of the rotor blade 16 extending from the tip 32, and may in some embodiments include the remaining portion of the rotor blade 16 between the inboard portion 52 and the tip 32. Additionally or alternatively, the outboard portion 54 may, in some embodiments, include approximately 33%, 40%, 50%, 60%, 67%, or any percentage or range of percentages therebetween, or any other suitable percentage or range of percentages, of the span from the tip 32.

As shown in FIGS. 2 through 6, the present disclosure is further directed to a shipping fixture 100. In general, the shipping fixture 100 can accommodate one or more rotor blades 16 therein, and is capable of transporting these rotor blades 16 in both land environments and marine environments. A shipping fixture 100 according to the present disclosure thus includes a first frame 102 and a second frame 104. The first frame 102 in general may be a marine transportation frame, and may thus primarily be utilized for transporting rotor blades 16 in marine environments. The second frame 104 in general may be a land transportation frame, and may thus primarily be utilized for transporting rotor blades 16 in land environments. Further, as discussed below, the second frame 104 is removably nestable to and at least partially within the first frame 102. Thus, when nested together, the first frame 102 at least partially surrounds the second frame 104, and allows for the stacking of adjacent shipping fixtures 100 (shown in phantom in FIGS. 3 and 4) on the shipping fixture 100. Thus, the shipping fixture 100, including the second frame 104 nested in the first frame 102, may be utilized for marine transportation of rotor blades 16. Further, however, the second frame 104 is removable from the first frame 102, and may itself act as an independent shipping fixture. Thus, the shipping fixture 100, including the second frame 104 removed from the first frame 102, may be utilized for land transportation of rotor blades 16.

Thus, during transportation of a rotor blade 16 according to the present disclosure, the rotor blade 16 may be mounted on the second frame 104 of the shipping fixture 100. The rotor blade 16 may then be transported on the shipping fixture 100, such as through a land environment on, for example, a truck and/or train. The second frame 104 may then be nested to the first frame 102 of the shipping fixture 100, and the rotor blade 16 then transported on the shipping fixture 100, such as through a marine environment on, for example, a ship. The second frame 104 may then be removed from the first frame 102 as required for further transportation of the rotor blade 16 on the shipping fixture, such as through another land environment. The use of one shipping fixture 100 with nesting first and second frames 102 and 104 according to the present disclosure thus decreases the time, cost, and amount of equipment required for shipping of rotor blades 16. Further the use of such a shipping fixture 100 reduces the risk of damage to the rotor blades 16 by eliminating the need to change the rotor blades 16 between different shipping fixtures for different environments.

A first frame 102 according to the present disclosure includes one or more first support members 110. In exemplary embodiments, a first support member 110 is a hollow structural section beam having for example a square or rectangular cross-sectional profile as shown, or a circular, oval or otherwise cross-sectional profile. Alternatively, a suitable first support member 110 according to the present disclosure may be an I-beam having a generally I or H shaped cross-sectional profile; a Z-beam having a generally Z shaped cross-sectional profile; a T-beam having a generally T shaped cross-sectional profile; a channel beam having a cross-sectional profile that defines a channel therein; an L-beam having a generally L shaped cross-sectional profile; a solid structural section having for example a square, rectangular, circular, oval or otherwise cross-sectional profile; a plate; a joist; or any other suitable structural member.

The first frame 102 and first support members 110 thereof may generally define an interior 111 of the first frame 102. For example, as shown, the first frame 102 may provide a skeleton that defines the outer perimeter of the shipping fixture 100, and thus further defines the interior 111 of the shipping fixture 100 therein. Thus, when nested in the first frame 102, the second frame 104 may be positioned and thus contained at least partially or fully within the interior 111 defined by the first frame 102.

The support members 110 may, as discussed, be arranged to define the outer perimeter of the first frame 102 and shipping fixture 100, and may thus be joined to each other at various locations along the support members 110. For example, each support member 110 may include a body 112 extending between a first end 114 and a second end 116. A support member 110 may be connected to another support member 110 at its first end 114 or second end 116, or at any other suitable intermediate location along the body 112. The support members 110 may be joined using any suitable joining technique or apparatus. For example, support members 110 may be welded together, or may be joined together using suitable mechanical fasteners, such as nut-bolt combinations, rivets, screws, nails, etc. The first frame 102 formed by the support members 110 may have any suitable shape and/or size. For example, the first frame 102 may be generally cubic or cuboid shaped, or generally conical, spherical, or cylindrical, or may have any other suitable shape.

A second frame 104 according to the present disclosure includes one or more second support members 120. Similar to the first support members 100, in exemplary embodiments, a second support member 120 is a hollow structural section beam having for example a square or rectangular cross-sectional profile as shown, or a circular, oval or otherwise cross-sectional profile. Alternatively, a suitable second support member 120 according to the present disclosure may be an I-beam having a generally I or H shaped cross-sectional profile; a Z-beam having a generally Z shaped cross-sectional profile; a T-beam having a generally T shaped cross-sectional profile; a channel beam having a cross-sectional profile that defines a channel therein; an L-beam having a generally L shaped cross-sectional profile; a solid structural section having for example a square, rectangular, circular, oval or otherwise cross-sectional profile; a plate; a joist; or any other suitable structural member.

The second frame 104 and second support members 120 thereof may in some embodiments generally define an interior (not shown) of the second frame 104, similar to the first frame 102, which one or more rotor blades 16 or portions thereof may be mounted in. In other embodiments as shown, the second frame 104 and second support members 120 may define, for example, a base support on which one or more rotor blades 16 or portions thereof may be mounted.

Similar to the first support members 110, the second support members 120 may be joined to each other at various locations along the support members 120. For example, each support member 120 may include a body 122 extending between a first end 124 and a second end 126. A support member 120 may be connected to another support member 120 at its first end 124 or second end 126, or at any other suitable intermediate location along the body 122. The support members 120 may be joined using any suitable joining technique or apparatus. For example, support members 120 may be welded together, or may be joined together using suitable mechanical fasteners, such as nut-bolt combinations, rivets, screws, nails, etc. The second frame 104 formed by the support members 120 may have any suitable shape and/or size.

As further shown in FIGS. 2 through 6, the first frame 102 further includes one or more first nesting features 132, while the second frame 104 includes one or more second nesting features 134. The nesting features 132, 134 may mate together to removably nest the second frame 104 to and at least partially within the first frame 102. For example, in exemplary embodiments, a nesting feature, such as a first nesting feature 132 or a second nesting feature 134, may be an ISO corner. FIGS. 2 through 6 illustrate the first nesting features 132 as ISO corners. As is generally known in the art, an ISO corner is a cube having a plurality of holes defined in various faces of the cube. For example, holes may be defined in all six faces, or in five, four, three, or two of the faces. The holes are sized and shaped to accommodate various protrusions therein. Because the holes are defined on the various faces, the protrusions can be placed into the holes at various suitable angles. Typically, an ISO corner is a cast piece formed from steel or another suitable metal. However, it should be understood that the present disclosure is not limited to ISO corners having any particular material, shape, or size, and rather that any suitable ISO corner is within the scope and spirit of the present disclosure.

Further, in exemplary embodiments, a mating nesting feature, such as the other of a first nesting feature 132 or a second nesting feature 134 that mates with an ISO corner, may be a rod. FIGS. 2 through 6 illustrate the second nesting features 134 as rods. The rods may be generally shaped and sized to fit within the holes defined in the ISO corners. Thus, to mate a first nesting feature 132 and second nesting feature 134 together to removably nest the second frame 104 to the first frame 102, the rod may be placed into the hole of an ISO corner, as shown.

It should be understood that the present disclosure is not limited to ISO corners and rods. Rather, the first nesting features 132 and second nesting features 134 may be any suitable components that may mate together to removably nest the first and second frames 102, 104. For example, one of the first nesting features 132 or second nesting features 134 may be any suitable female coupling component, while the other of the first nesting features 132 or second nesting features 134 is a suitable mating male coupling component, or vice versa.

As discussed, mating of the first and second nesting features 132, 134 together may removably nest the first frame 102 and second frame 104 together. Thus, the first nesting features 132 may be connected to the first frame 102, such as to the first support members 110 thereof, and the second nesting features 134 may be connected to the second frame 104, such as to the second support members 120 thereof. Such connection may be by welding, joining using suitable mechanical fasteners, or any other suitable joining technique or apparatus, or the nesting features may be integral with the support members. Further, in some embodiments as shown, a nesting feature 132, 134 may be disposed between, and thus join together, various support members 110 or 120 of a frame 102 or 104. For example, as shown, ISO corners may be disposed between and join together various first support members 110 of the first frame 102.

As shown in FIGS. 3 and 4, the first frame 102 is configured for stacking thereon of one or more adjacent shipping fixtures 100. The adjacent shipping fixtures 100 may be formed according to the present disclosure, or may be any other suitable fixtures configured to shipping any suitable components, including but not limited to rotor blades 16 and other wind turbine components. A shipping fixture 100 according to the present disclosure may thus be readied for shipping, such as on a ship, and an adjacent shipping fixture 100 may be placed on top of the shipping fixture 100 as shown. For example, as discussed, the first support members 110 define an outer perimeter of the first frame 102 that further defines an interior 111 of the first frame 102. By defining an outer perimeter that further defines an interior 111, the first support members 110 thus allow for adjacent shipping fixtures 100 to be stacked on the first frame 102. Upper or top first support members 110 or portions of support members 110 thus contact and support the adjacent stacked shipping fixtures 100, as shown. It should additionally be noted that the first frame 102 may additionally or alternatively be configured for stacking on an adjacent shipping fixture 100 in a similar fashion as discussed herein and with respect to lower or bottom support members 110.

In some embodiments, the first frame 102 further includes one or more connection features 136 for connecting the first frame 102 to the adjacent shipping fixtures 100. In exemplary embodiments, as shown, the connection features 136 are ISO corners. An adjacent shipping fixture 100 may include a rod that extends through the ISO corner to connect the adjacent shipping fixture 100 to the first frame 102, or the adjacent shipping fixture 100 may include an ISO corner, and a rod may be extended through the ISO corners of both the adjacent shipping fixture 100 and the first frame 102 to connect them together. Alternatively, the connection features 136 are rods, for mating with ISO corners of the adjacent shipping fixture 100. It should be understood, however, that the present disclosure is not limited to ISO corners and rods. Rather, the connection feature 136 may be any suitable component that may mate with a suitable mating component of the adjacent shipping fixture to connect the first frame 102 and adjacent shipping fixture 100. For example, the connection feature 136 may be any suitable male or female coupling component for connecting with a respective female or male coupling component of the adjacent shipping fixture 100.

Further, as discussed above with respect to the first and second nesting features 132, 134, the connection features 136 may be connected to the first frame 102, such as to the first support members 110 thereof. Such connection may be by welding, joining using suitable mechanical fasteners, or any other suitable joining technique or apparatus, or the connection features may be integral with the support members. Further, in some embodiments as shown, a connection feature 136 may be disposed between, and thus join together, various first support members 110 of first frame 102. For example, as shown, ISO corners may be disposed between and join together various first support members 110 of the first frame 102.

In some embodiments, the first frame 102 may include more than one portion. These portions may be separated for, for example, nesting and un-nesting of the second frame 104 and rotor blades 16 therein, and then connected together for shipping. As shown in FIGS. 2 through 4, for example, the first frame 102 may include a first frame portion 142 and a second frame portion 144. The first frame portion 142 may, in exemplary embodiments as shown, be a lower frame portion encompassing lower first support members 110, first nesting features 132, and connection features 136, while the second frame portion 144 may, in exemplary embodiment as shown, be an upper frame portion encompassing upper first support members 110, first nesting features 132, and connection features 136. For example, the lower frame portion may include the lower half or other suitable portion of the first frame 102, while the upper frame portion may include the upper half or other suitable portion of the first frame 102. The upper frame portion may be configured for stacking thereon of adjacent shipping fixtures 100, while the lower frame portion may be configured for stacking of the shipping fixture 100 on adjacent shipping fixtures. Alternatively, however, the first and second frame portions 142, 144 need not be upper and lower frame portions. Rather, the first and second frame portions 142, 144 may be side-by-side frame portions, front-to-back frame portions, or any other suitable portions of the first frame 102. The first and second frame portions 142, 144 may be connected together to form the first frame using any suitable technique or apparatus, such as welding, joining using suitable mechanical fasteners, or through the use of ISO corners and rods or other suitable coupling components as discussed herein.

As shown in FIGS. 2 through 4, a second frame 104 according to the present disclosure further includes one or more mounting features 150. Each mounting feature 150 is configured for mounting of a rotor blade 16, such as any suitable section or portion of a rotor blade 16, thereon. As shown, in some embodiments, a mounting feature 150 is configured for mounting an inboard portion 52 of a rotor blade 16 thereof, while in other embodiment, a mounting feature 150 is configured for mounting an outboard portion 54 of a rotor blade 16 thereon. Further, in some embodiments as shown, a second frame 104 may include one or more mounting features 150 configured for mounting an inboard portion 52 of one rotor blade 16 and other mounting features 150 configured for mounting an outboard portion 54 of another rotor blade 16 thereon. Still further, mounting features 150 may be provided for mounting inboard portions 52 and/or outboard portions 54 of any number of rotor blades.

The mounting features 150 for mounting of a rotor blade 16 thereon may be any suitable features capable of supporting and, if desired, securing the rotor blade 16. For example, in some embodiments as shown in FIGS. 2 through 4, a mounting feature 150 may include one or more cushions 152. A cushion 152 may support one or more exterior surfaces of the rotor blade 16. The rotor blade 16 when mounted on the mounting features 150 in the second frame 104 thus may be in contact with the cushions 152. The cushions 152 may have any suitable size and shape for supporting the rotor blade 16. Further, the cushions 152 may be formed from any suitable material having a desired firmness for supporting the rotor blade 16. As shown, cushions 152 may be included in mounting features 150 for mounting both inboard portions 52 and outboard portions 54, or any other suitable portions, of rotor blades 16 thereon.

In other embodiments, as shown in FIGS. 2 and 3, a mounting feature 150 may include one or more brackets 154. A bracket 154 is a generally rigid structure that can connect to a rotor blade 16 to mount the rotor blade 16 to the second frame 104. In exemplary embodiments, as shown, the bracket 154 connects to the root 34 of the rotor blade 16. Bolts or other suitable mechanical fasteners 156 extending from the root 34 are passed through holes 158 defined in the bracket 154 or brackets 154 to mount the rotor blade 16 to the bracket 154. Brackets 154 may be included in mounting features 150 for inboard portions 52 as shown in FIGS. 2 and 3, or for mounting outboard portions 54, or any other suitable portions, of rotor blades 16 thereon.

In some embodiments, one or more clamps (not shown) may additionally be included in the mounting features 150. These clamps may, for example, secure the rotor blade 16 to the mounting features 150. Additionally or alternatively, other components of the mounting features 150, such as the cushions 152 or brackets 154, may secure the rotor blade 16 to the mounting features.

The present disclosure is further directed to a method for transporting one or more rotor blades 16. The method includes, for example, removably nesting a second frame 104 at least partially within a first frame 102, as discussed above. This step is illustrated by reference numeral 200 of FIG. 7. The first frame 102 may be configured for stacking thereon of an adjacent shipping fixture. The second frame 104 may be configured for mounting of one or more rotor blades 16 thereon. One or more rotor blades 16 may be mounted on the second frame 104. The rotor blade 16 may be transported in a marine environment, as discussed above, mounted in the second frame 104 and first frame 102. This step is illustrated by reference numeral 202 of FIG. 7.

In some embodiments, the method may further include, for example, mounting the rotor blade 16 in the second frame 104. In some embodiments, the method may further include, for example, transporting the rotor blade 16 in a land environment, as discussed above, mounted in the second frame 104 removed from the first frame 102. This step is illustrated by reference numeral 204 of FIG. 7. Transporting in a land environment may occur before and/or after transporting in a marine environment, and transporting in a marine environment may occur before or after transporting in a land environment. In some embodiments, the method may further include removing the second frame 104 from the first frame 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shipping fixture for transporting a rotor blade, the shipping fixture configured for stacking thereon of an adjacent shipping fixture, the shipping fixture comprising:
    a first frame comprising a plurality of support members and a first nesting feature, the first frame further configured for stacking thereon of the adjacent shipping fixture, the first frame further comprising a first frame portion and a second frame portion separable from the first frame portion, wherein each of the first frame portion and the second frame portion comprises at least one of the plurality of first support members; and,
    a second frame comprising a second support member, a second nesting feature, and a mounting feature, the second nesting feature mating with the first nesting feature to removably nest the second frame to the first frame at least partially within the first frame, the mounting feature configured for mounting of the rotor blade thereon.

2. The shipping fixture of claim 1, wherein one of the first nesting feature and the second nesting feature is an ISO corner and the other of the first nesting feature and the second nesting feature is a rod.

3. The shipping fixture of claim 1, wherein the first frame further comprises a plurality of first support members and a plurality of nesting features, and wherein the second frame further comprises a plurality of second support members and a plurality of nesting features.

4. The shipping fixture of claim 1, wherein the first frame portion is a lower frame portion and the second frame portion is an upper frame portion, and wherein the second frame is removably mated to the lower frame portion.

5. The shipping fixture of claim 1, wherein the mounting feature comprises a cushion.

6. The shipping fixture of claim 1, wherein the mounting feature comprises a bracket.

7. The shipping fixture of claim 1, wherein the second frame is positioned entirely within the first frame when removably mated to the first frame.

8. The shipping fixture of claim 1, wherein the mounting feature is configured for mounting of an inboard portion of the rotor blade thereon.

9. The shipping fixture of claim 1, wherein the first frame further comprises a connection feature for connecting the first frame to the adjacent shipping fixture.

10. The shipping fixture of claim 9, wherein the connection feature is an ISO corner.

11. A shipping fixture for transporting a plurality of rotor blades, the shipping fixture configured for stacking thereon of an adjacent shipping fixture, the shipping fixture comprising:
    a first frame comprising a plurality of first support members and a plurality of first nesting features, the first frame further configured for stacking thereon of the adjacent shipping fixture; and,
    a second frame comprising a plurality of second support members, a plurality of second nesting features, and a plurality of mounting features, at least one of the plurality of second nesting features mating with at least one of the first nesting features to removably nest the second frame to the first frame at least partially within the first frame, the plurality of mounting feature configured for mounting of the plurality of rotor blades thereon, wherein at least one of the plurality of mounting features is configured for mounting of an inboard portion of one of the plurality of rotor blades thereon, and wherein at least one of the plurality of mounting features is configured for mounting of an outboard portion of one of the plurality of rotor blades thereon.

12. The shipping fixture of claim 11, wherein each of the plurality of first nesting features is an ISO corner and each of the plurality of second nesting feature is a rod.

13. The shipping fixture of claim 11, wherein the first frame further comprises a first frame portion and a second frame portion, and wherein each of the first frame portion and the second frame portion comprises at least one of the plurality of first support members.

14. The shipping fixture of claim 11, wherein at least one of the plurality of mounting feature comprises a cushion.

15. The shipping fixture of claim 11, wherein at least one of the plurality of mounting feature comprises a bracket.

16. The shipping fixture of claim 11, wherein the first frame further comprises a plurality of connection features for connecting the first frame to the adjacent shipping fixture.

17. A method for transporting a rotor blade, the method comprising:
   removably nesting a second frame at least partially within a first frame, the first frame configured for stacking thereon of an adjacent shipping fixture and comprising a first frame portion and a second frame portion separable from the first frame portion, and wherein a rotor blade is mounted on the second frame; and,
   transporting the rotor blade in a marine environment.

18. The method of claim 17, further comprising transporting the rotor blade in a land environment, the rotor blade mounted on the second frame, the second frame removed from the first frame.

* * * * *